No. 652,796. Patented July 3, 1900.
S. W. MACKEY.
SPRING CLAMP FOR TREATING HOOF CRACKS.
(Application filed Oct. 22, 1898.)
(No Model.) 2 Sheets—Sheet 1.

Witnesses:
G. A. Pennington
Geo. W. Brown

Inventor:
Samuel Webster Mackey
by Joseph W. Buell
Attorneys.

THE NORRIS PETERS CO., PHOTO-LITHO., WASHINGTON, D. C.

No. 652,796. Patented July 3, 1900.
S. W. MACKEY.
SPRING CLAMP FOR TREATING HOOF CRACKS.
(Application filed Oct. 22, 1898.)
(No Model.) 2 Sheets—Sheet 2.
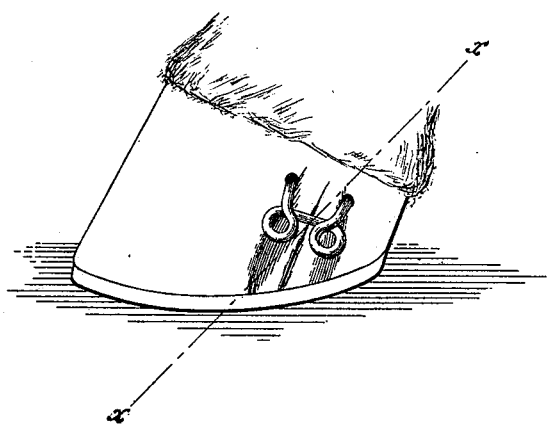
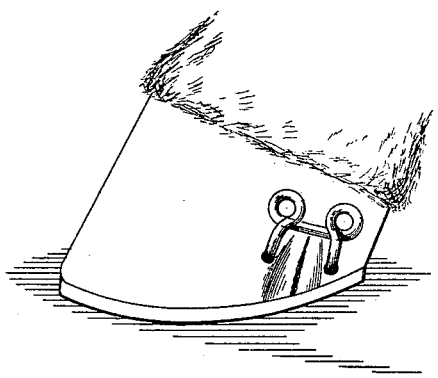
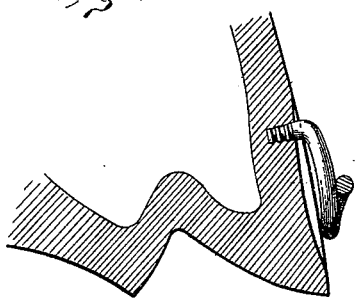

UNITED STATES PATENT OFFICE.

SAMUEL WEBSTER MACKEY, OF BALTIMORE, MARYLAND.

SPRING-CLAMP FOR TREATING HOOF-CRACKS.

SPECIFICATION forming part of Letters Patent No. 652,796, dated July 3, 1900.

Application filed October 22, 1898. Serial No. 694,309. (No model.)

*To all whom it may concern:*

Be it known that I, SAMUEL WEBSTER MACKEY, a citizen of the United States, residing at Baltimore, in the State of Maryland, have invented certain new and useful Improvements in Spring-Clamps for Treating Hoof-Cracks; and I do hereby declare the following to be a full, clear, and exact description of the invention, such as will enable others skilled in the art to which it appertains to make and use the same.

One object of my invention is to provide an artificial appliance for closing cracks in the hoofs of horses and which comprises a simple spring-clamp that is cheap to manufacture and that can be readily attached to the hoof across the crack therein to bring by the exertion of spring-pressure the divided parts or borders of the crack in the hoof-wall into apposition.

A further object of my invention is to afford a device for the above-mentioned purpose that can be made of a single piece of properly-tempered wire and that can be constructed and arranged to present its exposed parts so that they will lie flat upon the hoof and be substantially in one given plane, thereby reducing the liability to accidental displacement.

Essentially the device consists of a pair of spring-controlled lever-arms that are provided at their free ends with inclined pendent prongs or fingers, while said levers are controlled in their movement and pressure by a spring-tension device arranged intermediate of their ends and by means of which the levers are adapted when spread apart and attached to the hoof, as shown, to act with equal effect in opposite directions in their efforts to recover their natural lines of structural adjustment, but with diminishing leverage and consequent varying force corresponding to the distance they occupy from normal position, thereby continuing to exert the proper pressure to the proper depth as the crack closes, the whole arranged and constructed to lie flat against the face of the hoof.

Figure 1:
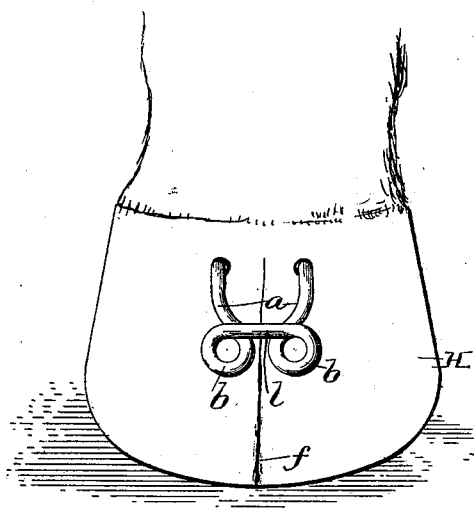
Figure 2:
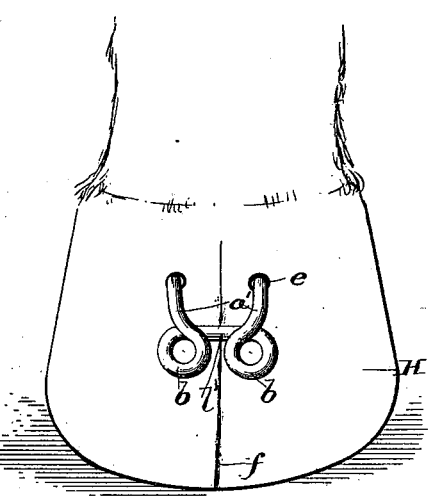
Figure 3:
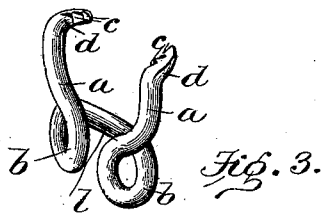
Figure 4:
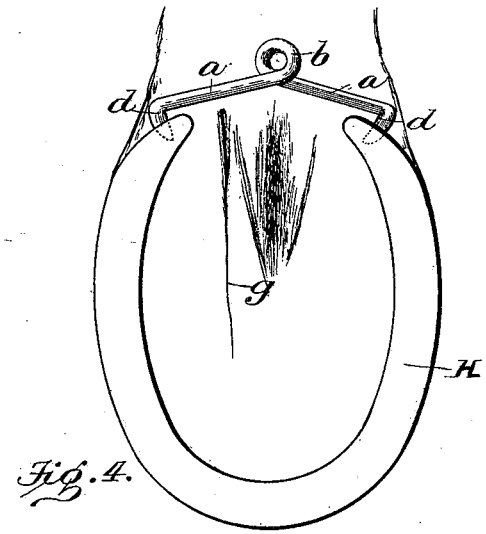

In the drawings, Figure 1 is a view in perspective of a hoof with the crack-closing device arranged to close a toe-crack. Fig. 2 is a like view showing the loop of the device reversed. Fig. 3 is a view in perspective of the device unattached, while Fig. 4 shows a modified form in its attached relation to the sole and shoe of the hoof for treating sole-cracks. Fig. 5 is a view in perspective of the hoof with the device arranged to close a concave quarter-crack, while Fig. 6 shows a section of Fig. 5 taken on lines $x\ x$. Fig. 7 shows in perspective the application of the device to a quarter-crack that extends only part way up from the sole.

Like letters of reference indicate like parts in the several figures.

Referring to the drawings by letter, $a$ designates two spring-lever arms, provided at their free ends with a finger $b$, which projects at practically right angles to the main portion of the arm, the fingers projecting from the same side and may be either straight or inclined toward each other, as the conditions of use require. These pendent fingers serve to attach the device to the hoof by their insertion into recess $c$, bored to a proper depth on either side of the crack to be closed. These recesses are bored generally to a depth of three-eighths of an inch, so as to extend nearly through the wall of the hoof; but in cases where it is desirable to treat internal festers the recesses can be sunk to a point where they serve as a vent to the corrupt matter therein. The fingers are tapered and are preferably provided with corrugations $d$, that serve as a fastening means to hold the fingers seated in the holes or recesses into which they are inserted.

As it is not convenient to use large lever-arms and as it is necessary to have sufficient power or pressure to act continuously from either side of the crack and in opposite directions, I provide the spring-arms $a$ with a spring-tension device $b$, located intermediate of the ends of said levers, which spring-tension device may consist of one or more spring-connecting loops or coils that are arranged to lie substantially in the same plane, so that the device will lie close against the face of the hoof, thereby avoiding accidental displacement to a great extent.

For cracks in the face of the hoof, as in Figs. 1 and 2, the arms are made substantially parallel and are provided with a pair of balanced spring-tension coils; but for sole-cracks the arms are spread wide apart, as shown in Fig. 4, so as to engage in recesses bored in the outer surface of the hoof, and for which purpose I prefer to employ a single spring-loop. In this case the arms and loop lie close up against the back of the hoof, as shown in Fig. 4. When thus used for sole-cracks, the device is made larger than when employed for treating cracks in the face of the hoof.

It has been found by experience that in a device of the kind herein described the range of action is sufficient to encompass the widest cracks, and when applied it will bring strong pressure to bear upon the divided walls of the hoof to bring the borders of the crack together and hold them in opposition until the laminae or soft tissues grow down from the coronet and become intimately attached to the inner surface of the wall of the hoof and bridge across interiorly the crack.

The device when applied to concave cracks tends to draw out the concave wall portions to their natural lines of fulness.

The number of clamps to be used on a given crack is determined by the length of the crack and they may be applied as shown in Fig. 1— that is, with the spring-arms and loop turned upward; but when the crack has closed somewhat another like device with the loop turned downward may be used.

Having described my invention, what I desire to claim as new and useful is—

1. A spring-clamp for closing hoof-cracks, consisting of a pair of spring-arms adapted to react toward each other and connected by spring-coil connections at one end, each arm being provided at its free end with a rigid finger projecting at an angle to the arm, both fingers being turned in the same direction, substantially as described.

2. A spring-clamp for hoof-cracks comprising a pair of arms having their free ends provided each with a rigid finger projecting at substantially right angles to its arm, the two fingers being inclined toward each other, and the opposite ends of the arms being connected by spring-coil connections, substantially as described.

3. A clamp for treating hoofs, comprising a single continuous piece of metal coiled to provide arms extending in substantially the same plane, each arm being provided with a pendent finger, said fingers being provided with corrugated portions, substantially as described.

In testimony whereof I affix my signature in presence of two witnesses.

SAMUEL WEBSTER MACKEY.

Witnesses:
GEO. W. BROWN,
EDWIN H. SERRIN.